(No Model.)
A. ALEXANDRE.
FASTENING FOR CLOSING PURSES.
No. 284,791. Patented Sept. 11, 1883.
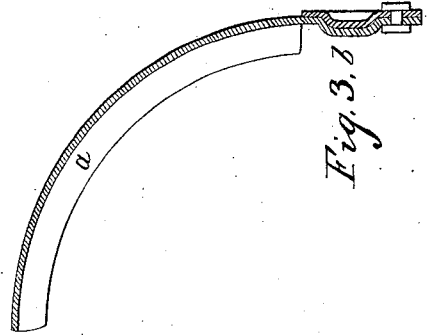
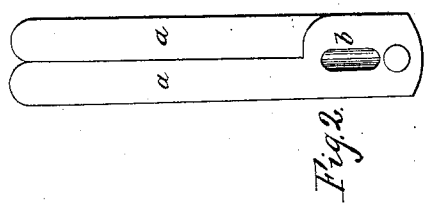
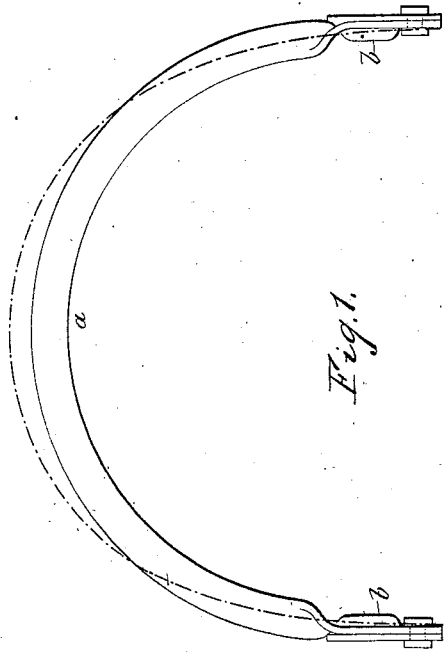
Witnesses:
C. Sedgwick
Alfred H. Davis
Inventor
A. Alexandre
By Munn & Co
Attorneys

UNITED STATES PATENT OFFICE.

ARTHUR ALEXANDRE, OF PARIS, FRANCE.

FASTENING FOR CLOSING PURSES.

SPECIFICATION forming part of Letters Patent No. 284,791, dated September 11, 1883.

Application filed July 12, 1883. (No model.)

*To all whom it may concern:*

Be it known that I, ARTHUR ALEXANDRE, manufacturer, of the city of Paris, France, have invented new and useful Improvements in Fastenings for Closing Purses and other Articles, of which the following is a full, clear, and exact description.

My invention relates to improvements in frames for purses, pouches, and the like; and it consists in providing them at their ends with projections and cavities to hold them locked together, as hereinafter fully described.

Reference is to be had to the accompanying drawings, forming a part of this specification, in which similar letters of reference indicate corresponding parts in all the figures.

Figure 1 is a side view of the frame. Fig. 2 is an end view of the same, and Fig. 3 is a detail sectional view.

The two bows $a$, composing the frame, are perfectly plain, except that their flattened ends are stamped up at $b$ near the joint-pivot, so as to form rounded projections on the ends of the one bow and corresponding cavities on those of the other bow, these projections and cavities being upon the adjacent surfaces, and the ends overlapping and being secured together by rivets, which form the joint-pins, so that when the bows are closed together the projections of the one fit into the cavities of the other, as shown, thus forming a locking device to hold the bows closed. In opening or separating the bows a certain amount of force is required to cause the projections to leave the cavities, as they can only do so by springing the one or other bow and altering its curvature, as represented to an exaggerated degree by the dotted lines. In closing, the elasticity of the bows causes them to resume their primitive form when the projections again fall into the cavities.

It should be observed that the invention is not limited to this particular form or construction, as other means may be adopted to bring the elasticity of the bows into play for the same purpose. Thus the joint-pin is represented as being a rivet; but it is evident that the joint may be made by fitting the ends of the one bow in the other in the manner of a ball and socket or otherwise.

I claim—

1. A frame for purses, pouches, and the like, consisting of bows hinged together and provided with projections and cavities near their ends to hold the bows locked together, substantially as herein shown and described.

2. A frame for purses, pouches, and the like, consisting of two hinged bows provided with flattened ends having projections and cavities formed in them, substantially as herein shown and described.

The foregoing specification of improvements in fastening for closing purses and other articles signed by me this 25th day of June, 1883.

ARTHUR ALEXANDRE.

Witnesses:
 EDWARD P. MACLEAN,
 JEAN BAPTISTE ROLLAND.